Patented Oct. 9, 1951

2,570,217

UNITED STATES PATENT OFFICE 2,570,217

CONCENTRATION PROCESS

Henry K. Dice and Robert L. Mitchell, Corpus Christi, Tex., assignors to Celanese Corporation of America, New York, N. Y., a corporation of Delaware No Drawing. Application November 5, 1949, Serial No. 125,834

3 Claims. (Cl. 260—452)

This invention relates to the treatment of oxidation products and relates more particularly to a process for the concentration and purification of a fraction of the oxidation products obtained by the vapor phase partial oxidation, with air or oxygen, of aliphatic hydrocarbons, such as propane, butane or mixtures thereof.

The vapor phase, partial oxidation of aliphatic hydrocarbons, such as propane, butane or mixtures thereof, employing air or oxygen as the oxidizing agent, yields a complete mixture of products including formaldehyde, acetaldehyde, formic acid, methanol, acetone, methylal and other acetals, methyl ethyl ketone, tetrahydrofuran and other oxides. The oxidation is effected by mixing butane or propane with a predetermined amount of air or oxygen, heating the mixture to reaction temperature and allowing the resulting exothermic oxidation reaction to proceed to the desired degree. Since only a partial oxidation is desired, the reaction temperature must be controlled within precise limits and completely halted when the desired degree of oxidation has been effected. The oxidation reaction may be halted, for example, by lowering the temperature of the gaseous reaction mixture to such degree that the oxidation reaction will no longer be self-supporting. The temperature may be lowered, for example, by quenching the hot reaction gases with a circulating stream of a cool aqueous medium. On being quenched, the oxygenated organic compounds present in the gaseous reaction mixture are initially absorbed in the circulating aqueous medium to a substantial degree and a hot aqueous solution of oxygenated organic compounds is obtained. Under the conditions of temperature and pressure prevailing, however, the major portion of the more volatile of said oxygenated products subsequently flashes off from the aqueous quenching medium leaving an aqueous solution comprising essentially formaldehyde, formic acid and some of the methanol. The aqueous mixture remaining, after being cooled, is advantageously recycled for the purpose of effecting further quenching. The recycled quenching medium is preferably maintained at a controlled formaldehyde concentration by constantly taking off a side-stream of the circulating formaldehyde solution and introducing an equivalent volume of water into the system.

Due to the complex nature of the product mixture obtained by the vapor phase partial oxidation of said hydrocarbons, as described, the separation and purification of the products which are present in the circulating aqueous formaldehyde solution employed as the quenching medium and also the separation and purification of the mixture of volatile products which flash off from the quenching medium is also quite complex. The separation and purification are further complicated by the fact that many of the oxygenated products, under certain conditions, tend to undergo further chemical reaction. For example, the oxides present will, under acid conditions and elevated temperature, tend to hydrolyze to form the corresponding glycols and the latter then readily react with the aldehydes present to yield formals and acetals. The presence of many of the formals and acetals may also be traced to reaction between the various aldehydes and alcohols which are present. These internal chemical reactions are highly disadvantageous. The formals and acetals thus formed not only reduce the yield of the more valuable and more desirable elementary compounds, but the formals and acetals formed are found to be difficult to separate from the remaining products during the purification operations employed. This is due to the fact that their boiling points are often very close to the boiling points of many of the other compounds and that they frequently form azeotropes therewith.

While control of the pH obtaining during the quenching step by the addition of caustic soda to the circulating quench medium so as to render the aqueous formaldehyde solution formed less acid in character has a highly favorable action with respect to suppressing the formation of formals and acetals during the quenching step, the general improvements noted by the use of this expedient do not, however, carry beyond said quenching step. The sodium formate formed by the partial neutralization of the formic acid present in the product is not volatile and on distillation of the partly neutralized side stream of aqueous formaldehyde taken from the quench step a product fraction of undesirably low pH is distilled off. Since temperatures sufficiently high to initiate further chemical reaction of potentially reactive components are employed during the subsequent separation and purification steps, such reactions are found to occur quite readily. Thus, for example, certain of the volatile organic esters present may undergo hydrolysis to yield other organic acids in addition to the free formic acid present in the quenching medium. Furthermore, if a portion of the formaldehyde present undergoes a Cannizzaro reaction methyl formate may be produced by further reaction of the methanol and formic acid so formed and subsequent hydrolysis of this ester increases the acidity of the product solutions being concentrated and purified to a degree sufficient to favor further acetal and formal production. This same problem of having an undesirably low pH is also present during the separation and purification of those products which flash off during the quenching step and which are then absorbed in water to form a crude product solution.

It is therefore, an important object of this invention to provide an improved process for the separation of the aqueous mixture of oxygenated organic compounds obtained during the quenching and absorption of the hot gaseous mixture of oxygenated organic compounds formed as a product of the vapor phase partial oxidation of hydrocarbons whereby the formation of acetals, formals, glycols, etc. by reaction of the compounds present therein is substantially eliminated.

Other objects of this invention will appear from the following detailed description.

We have now found that by suitable pH control of the various product streams beyond the quenching step, when effecting the separation and purification of the mixture of oxygenated organic compounds produced by the vapor phase partial oxidation of aliphatic hydrocarbons, the formation of acetals and formals and the hydrolysis of the oxides present in said product mixtures may be substantially eliminated. Preferably, the product streams are maintained at a pH of from about 4 to 6.5 and preferably in the range 5 to 6 during the separation and purification operations.

Control of the pH may be achieved advantageously by adding suitable quantities of a neutralizing agent to the product mixtures undergoing separation and purification. Examples of suitable neutralizing agents are sodium acetate, sodium phosphate, potassium borate or sodium phthalate although any neutralizing agent capable of acid neutralization whereby the pH may be controlled is suitable. The most satisfactory results are achieved employing sodium acetate as the neutralizing agent since the acetic acid which is freed as a result of the neutralization of the formic acid is readily separated in the purification steps which follow. It is, furthermore, a weaker acid than formic acid and does not yield as low a pH.

In order further to illustrate our invention, but without being limited thereto, the following examples are given:

*Example I*

A mixture of isobutane, oxygen and inert gases in which the oxygen is present in an amount of about 10% by volume, based on the isobutane, is continuously formed and continuously heated to a temperature of about 600 to 650° F. A partial oxidation of the butane takes place under these conditions yielding a mixture of hot reaction gases containing unreacted isobutane and inert gases together with a number of oxygenated organic compounds. The oxygenated organic compounds formed include not only formaldehyde, higher aldehydes and formic acid but also acetone, methyl ethyl ketone, methanol, oxides and various other oxygenated organic compounds. The mixture of hot reaction gases thus obtained is quenched below oxidation reaction temperature by being brought into intimate contact with a cooled aqueous medium. On being brought into contact with the hot gases the temperature of the aqueous medium is raised substantially, reaching a temperature of the order of 200° F. The aqueous quenching medium absorbs substantially all of the formaldehyde and formic acid in the reaction gases together with some methanol and relatively small amounts of higher molecular weight carbonyl compounds and oxides, while the remaining reaction products, which are initially absorbed, ultimately flash off from the solution thus formed in the vessel in which the quenching step is effected. The hot aqueous solution remaining is then cooled, a side stream continuously taken off so that the formaldehyde may be separated therefrom and the cooled solution, after substantially neutralizing the acids therein by the addition thereto of a suitable quantity of a 20% by weight aqueous solution of sodium hydroxide to adjust the pH thereof to about 5, is then recycled to effect further quenching. The oxygenated reaction products which are flashed off overhead during the quenching step are absorbed in water and the resulting aqueous solution is subjected to separation and purification with a suitable adjustment of the pH thereof, as will be hereinafter described.

*Example II*

The partially neutralized aqueous formaldehyde side stream obtained on quenching the hot reaction gases as described in Example I is then subjected to distillation and purification. While comprising essentially an aqueous solution containing about 12 to 14% by weight of formaldehyde, the side stream also contains the sodium formate formed by the addition of sodium hydroxide to the quenching medium to adjust the pH thereof, free formic acid, and relatively small amounts of other compounds including various acetals, some methanol, reactive carbonyl compounds of higher molecular weight than formaldehyde, methylal and oxides, such as for example, butylene oxide. The crude aqueous formaldehyde solution is subjected to a series of distillations to effect a concentration of the formaldehyde and these distillations of the crude solution include a distillation under pressure followed by an initial and then a secondary flash distillation. The pH of the solution from the overhead of the pressure distillation would normally be rather low without suitable adjustment, and acetal formation, together with oxide hydrolysis, would be favored. To avoid these undesirable effects an aqueous solution containing about 1 to 10% by weight of sodium acetate is introduced with the reflux to the pressure column in an amount sufficient to react with any free formic acid present and to maintain the solution on the trays at the top of the distillation column in which the distillation is being effected at a pH of about 4.0 to 4.5, thereby also maintaining the pH of the solution withdrawn from this column at about 4.8 to 5.2.

The distillate from the initial pressure distillation is passed to a second column where a flash distillation is effected. Aqueous sodium acetate is introduced with the reflux to this column in an amount sufficient to maintain the pH of the solution at the base of this flash column at about 4.0 to 5.0. The solution withdrawn from the base of the first flash column is then subjected to evaporation whereby the same is concentrated to the desired degree. The overhead from the first flash column is also then flash distilled and the pH of the solution at the base of the second column is adjusted by means of an aqueous sodium acetate addition to the reflux of this column so that the pH of said solution is maintained at about 4.5 to 5.5. The overhead from the second flash distillation is separated into the individual products contained therein. The solution from the base is recycled in the system and the formaldehyde recovered therefrom.

By maintaining the pH of the several solutions undergoing separation and concentration at the levels set out above, substantially improved yields of the oxides present are obtained. Said yields are found to be increased to such an extent that whereas almost 90% of said oxides hydrolyzed, substantially complete recovery is obtained by specific control of the pH. The acetals present, such as methylal and higher acetals, are found to be greatly decreased in amount and the hydrolysis of the oxides present, such as propylene oxide and butylene oxide, kept at a minimum. These changes have a two-fold effect. The reduction in the methylal and higher acetal content of the solutions undergoing separation and purification not only enables the propylene oxide, butylene oxide, methyl ethyl ketone, tetrahydrofuran and other products of the vapor phase oxidation reaction to be obtained in purified form but a greatly simplified purification procedure is possible in the subsequent purification steps.

*Example III*

The aqueous solution obtained by absorbing in water the oxygenated reaction products flashed off from the crude aqueous solution of formaldehyde formed during the quenching operation, as described in Example I, is also separated into the several organic compounds contained therein by a series of distillation operations. The initial distillation removes acetaldehyde, the second distillation removes acrolein and subsequent distillations enable the acetone, methanol, and other compounds which are present in the remainder to be separated in relatively pure form. Without adjustment of the pH during the acetaldehyde and acrolein distillations, the acidity of the solutions will normally be sufficiently high to favor acetal formation and oxide hydrolysis. The pH is adjusted conveniently by introducing an aqueous solution of sodium acetate with the aqueous feed to the acetaldehyde distillation column, sufficient sodium acetate being introduced to maintain a pH of about 5.0 to 6.0 within the column. The pH during the acrolein distillation is also maintained at from about 5.0 to 6.0 by introducing aqueous sodium acetate into the distillation column in which the acrolein distillation is effected.

These adjustments in the pH during the acetaldehyde and acrolein distillations also result in substantial decreases in the extent of the oxide hydrolysis, in the production of acetals and esters, and in a substantial increase in the aldehydes and alcohols recovered. The repression of the many internal reactions which are prone to take place when strongly acid conditions exist during the several distillation reactions which are carried out to effect the desired separations, reduces the number of components in the mixtures being separated, thus enabling products of high purity to be obtained directly and without employing excessively intricate purification schemes.

It is to be understood that the foregoing detailed description is given merely by way of illustration and that many variations may be made therein without departing from the spirit of our invention.

Having described our invention, what we desire to secure by Letters Patent is:

1. In a process for the separation and purification of the oxygenated organic compounds in the mixture of hot reaction gases produced by the vapor phase partial oxidation of aliphatic hydrocarbons, said hot reaction gases containing formaldehyde, which process includes absorbing a portion of the products including the formaldehyde in an aqueous formaldehyde quenching medium to form a crude formaldehyde solution and absorbing the remainder of the oxygenated products in water to form a solution thereof, the steps which comprise separating the organic compounds in the aqueous solution of said remainder of the oxygenated organic compounds by a plurality of distillation operations yielding a plurality of separate streams while maintaining the pH of each of the streams on the acid side and at a pH of about 4.0 to 6.5 by adding a neutralizing agent thereto to effect a reduction in the normal acidity of said streams.

2. In a process for the separation and purification of the oxygenated organic compounds in the mixture of hot reaction gases produced by the vapor phase partial oxidation of aliphatic hydrocarbons, said hot reaction gases containing formaldehyde, which process includes absorbing a portion of the products including the formaldehyde in an aqueous formaldehyde quenching medium to form a crude formaldehyde solution and absorbing the remainder of the oxygenated products in water to form a solution thereof, the steps which comprise separating the organic compounds in the aqueous solution of said remainder of the oxygenated organic compounds by a plurality of distillation operations yielding a plurality of separate streams while maintaining the pH of each of the streams on the acid side and at a pH of about 4.0 to 6.5 by adding a neutralizing agent comprising an aqueous solution of sodium acetate thereto to effect a reduction in the normal acidity of said streams.

3. In a process for the separation and purification of the oxygenated organic compounds in the mixture of hot reaction gases produced by the vapor phase partial oxidation of aliphatic hydrocarbons, said hot reaction gases containing formaldehyde, which process includes absorbing a portion of the products including the formaldehyde in an aqueous formaldehyde quenching medium to form a crude formaldehyde solution and absorbing the remainder of the oxygenated products in water to form a solution thereof, the steps which comprise separating the organic compounds in the aqueous solution of said remainder of the oxygenated organic compounds by a plurality of distillation operations yielding a plurality of separate streams while maintaining the pH of each of the streams on the acid side and at a pH of about 4.0 to 6.5 by adding a neutralizing agent comprising an aqueous solution of sodium hydroxide thereto to effect a reduction in the normal acidity of said streams.

HENRY K. DICE.
ROBERT L. MITCHELL.

REFERENCES CITED

The following references are of record in the file of this patent:

UNITED STATES PATENTS

| Number | Name | Date |
|---|---|---|
| 2,042,314 | James | May 26, 1936 |
| 2,153,526 | Walker | Apr. 4, 1939 |
| 2,467,993 | Rossman | Apr. 19, 1949 |